Figure 1:
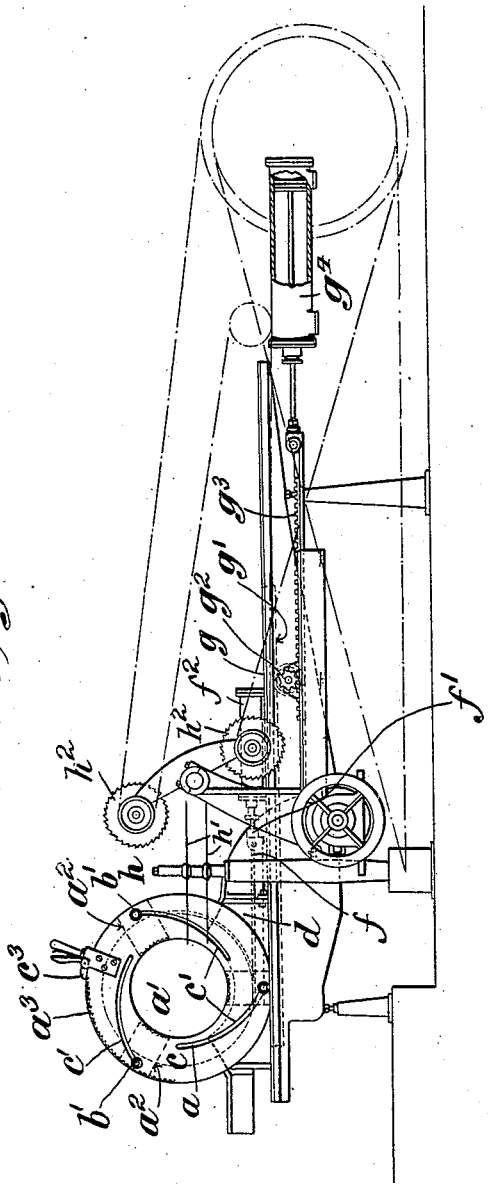

No. 848,226. PATENTED MAR. 26, 1907.
J. DOULL.
CHUCK FOR TIMBER FRAMING MACHINES.
APPLICATION FILED JAN. 10, 1906.

2 SHEETS—SHEET 1.

Attest:
Edgeworth Greene
Robert Coldwell

Inventor:
James Doull
by Redding, Kiddle & Greeley
Attys.

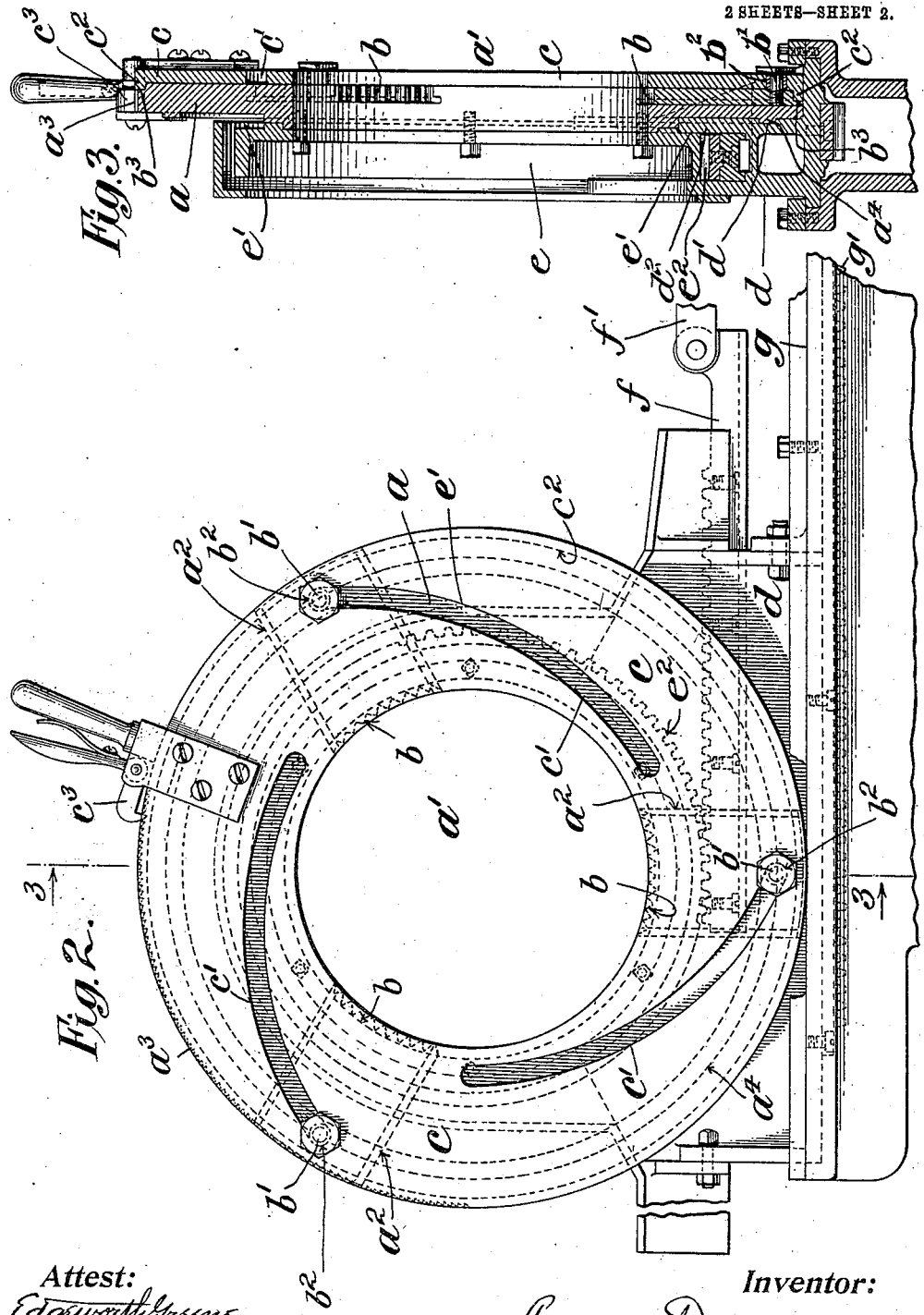

UNITED STATES PATENT OFFICE.

JAMES DOULL, OF BUTTE, MONTANA.

CHUCK FOR TIMBER-FRAMING MACHINES.

No. 848,226.　　　　Specification of Letters Patent.　　　Patented March 26, 1907.

Application filed January 10, 1906. Serial No. 295,349.

*To all whom it may concern:*

Be it known that I, JAMES DOULL, a citizen of the United States, and a resident of Butte city, in the county of Silverbow, in the State of Montana, have invented certain new and useful Improvements in Chucks for Timber-Framing Machines, &c., of which the following is a specification, reference being had to the accompanying drawings, forming a part hereof.

The object of this invention is primarily to provide a chuck of improved construction for holding round timbers during the framing or cutting tenons on the ends of round timbers in timber-framing machines; but it will be obvious as this description proceeds that the improved chuck is adapted for use in machines other than those of the particular kind referred to. In accordance with the invention the chuck is so constructed as to center the timber with certainty and to hold it securely during whatever operations may be performed upon it. The chuck is also constructed in such manner as to permit these results to be secured with a minimum of labor on the part of the machine operator. Furthermore, the chuck, as described hereinafter, is so constructed and so mounted upon its support as to permit the timber to be rotated readily for the purpose of presenting it in different positions to the devices which operate upon it, while at the same time the timber is securely held.

The invention will be more fully explained hereinafter with reference to the accompanying drawings, in which it is illustrated, and in which—

Figure 1 is a view in side elevation of so much of a timber-framing machine of a well-known type as is necessary to enable the application thereto of the improved chuck to be understood. Fig. 2 is a view in side elevation, on a larger scale, of the improved chuck and the parts of the timber-framing machine immediately associated therewith. Fig. 3 is a view in section on the plane indicated by the line 3 3 of Fig. 2.

In the embodiment of the invention which is illustrated in the drawings the chuck is shown as applied to a timber-framing machine of a well-known type, in which the timber to be framed being grasped by two similar chucks, one of which is shown in Fig. 1, is carried forward through two timber-framing heads which operate simultaneously upon the two ends of the timber to form two opposite sides of the tenons and is then given a quarter-turn and brought back through the same framing-heads by which the other two opposite sides of each tenon are completed. The chuck will therefore be described with particular reference to its application to a machine referred to, although it will be understood that the construction of the chuck and the devices for supporting it might be varied more or less for different applications of the chuck.

As shown particularly in Figs. 2 and 3 of the drawings, the chuck comprises, primarily, a jaw-plate $a$, which is preferably circular in external outline and is provided with an aperture $a'$, also preferably circular, of a diameter greater than that of the largest timber to be handled. This plate is provided with radial recesses $a^2$, (indicated by dotted lines in Figs. 1 and 2,) in which are mounted radial dogs or jaws, preferably three in number and preferably toothed at their inner ends, as clearly indicated in the drawings, so that they shall engage the timber firmly. Each dog or jaw is provided with a projecting stud $b'$, preferably headed and having an antifriction-roller $b^2$. A cam-plate or operating-plate $c$, having eccentric slots $c'$, is arranged to coöperate with the jaws or dogs $b$, the stud $b'$ of each jaw engaging the corresponding slot $c'$. The plate $c$ is ring-like corresponding to the jaw-plate $a$ and may be held against the plate $a$ by the heads of the studs $b'$. It is provided with a lip or flange $c^2$, which is seated in an annular recess $b^3$ of the plate $a$ and centers the operating or cam plate and provides a bearing therefor on the plate $a$. A portion of the periphery of the plate $a$ is provided with ratchet-teeth, as at $a^3$, for engagement by a spring-pressed dog $c^3$, carried by the operating-ring $c$, so that said ring or plate $c$ shall be retained in its adjusted position, with the jaws $b$ projected more or less toward the center of the aperture $a$ through the action of the eccentric or cam slots $c'$.

As stated above, the clutch in the machine referred to is arranged to have a partial rotation. For this purpose it is mounted upon a chuck-frame $d$, which may be provided with a segmental groove $d'$ for engagement by a segmental rib $a^4$ on the plate $a$. There is also secured to said plate $a$ a ring $e$, an annular recess $e'$ being formed between the plate and the ring to receive a segmental rib $d^2$, which is projected upwardly from the chuck-frame $d$. Through the coöperation of the rib $d^2$ with the plate $a$ and the ring $e$ and of the segmental rib $a^4$ with the segmental groove or recess $d'$ the plate $a$ is securely supported upon the chuck-frame with freedom to turn about its own axis. To effect the particular rotation of the chuck, a segmental gear $e^2$ is formed upon or secured to the ring $e$ and is engaged by a rack $f$, arranged to slide in suitable ways in the frame $d$, and connected by a link $f'$ with the piston of a pneumatic cylinder $f^2$, through the operation of which the chuck can have imparted to it a partial rotation in either direction at the proper time.

Both the chuck-frame $d$ and the cylinder $f^2$ are mounted upon a carriage $g$, which is arranged to be reciprocated, having in the machine shown a rack $g'$, which is operated, through suitable intermediate gearing (indicated at $g^2$) and a rack $g^3$, by a pneumatic cylinder $g^4$. The framing-head of the machine referred to is sufficiently represented at $h$, comprising two horizontal saws $h'$ and two vertical saws $h^2$. It will be understood that there are two carriages $g$, one for each chuck, and two framing-heads $h$, which are suitably spaced apart to operate simultaneously on opposite ends of the timber to be framed.

In the operation of the chuck and of the machine referred to the timber to be framed is brought to the machine by suitable rolls and with their aid is pressed through the apertures $a'$ of the two chucks resting therein. The operating-plate $c$ is then given a partial rotation, and the dogs $b$ are thereby projected toward the center, being caused to grasp the timber firmly. As the dogs are moved simultaneously, they center the timber with certainty. Through the engagement of the dog $c^3$ with the rack $a^3$ the dogs or jaws $b$ are held in firm engagement with the timber, which is thus supported in proper position for the first operation of the framing-head. The carriages $g$ are then moved forward, carrying the timber through the framing-heads in a forward direction. At the completion of the forward movement the chucks are given a quarter-rotation through the operation of the pneumatic cylinder $f^2$, and the carriages are then moved in the opposite direction, carrying the timber back through the framing-heads, by which the framing of the tenons is completed. The dog $c^3$ is then disengaged from the ratchet $a^3$, and the jaws $b$ are withdrawn, permitting the timber to be removed and to be replaced by another.

It will be understood that the details of construction and arrangement may be varied as may be required by different conditions of use.

I claim as my invention—

The combination of a chuck-frame provided with a longitudinal guideway and a segmental groove, a jaw-plate having a segmental rib to engage said groove, a central aperture and radial recesses, jaws sliding in said recesses and having each a stud, a ring-like cam-plate having eccentric slots engaging the studs of the jaws and having a flange to enter an annular recess in the cam-plate, locking means to hold the cam-plate in relative position to the jaw-plate, a second ring secured to the jaw-plate and forming therewith an annular recess, the chuck-frame having a segmental rib to engage said recess and said ring being formed with gear-teeth, and a rack sliding in the guideway in the chuck-frame and engaging said gear-teeth.

This specification signed and witnessed this 29th day of December, A. D. 1905.

JAMES DOULL.

In presence of—
H. C. HOPKINS,
GERALD B. KNOTT.